United States Patent
Seng et al.

(10) Patent No.: US 8,595,684 B1
(45) Date of Patent: Nov. 26, 2013

(54) ASSISTANCE TOOL

(71) Applicant: Xilinx, Inc., San Jose, CA (US)

(72) Inventors: Shay P. Seng, San Jose, CA (US); Amit Kasat, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 13/796,702

(22) Filed: Mar. 12, 2013

(51) Int. Cl.
G06F 15/04 (2006.01)
G06F 17/50 (2006.01)

(52) U.S. Cl.
USPC ............................................................ 716/139

(58) Field of Classification Search
USPC ........................................................ 716/139
See application file for complete search history.

(56) References Cited

U.S. PATENT DOCUMENTS

| | | |
|---|---|---|
| 2005/0268258 A1* | 12/2005 | Decker ............................. 716/4 |
| 2012/0180014 A1* | 7/2012 | Fang et al. .................... 716/112 |
| 2012/0227023 A1* | 9/2012 | Bendicksen et al. .......... 716/112 |
| 2013/0074024 A1* | 3/2013 | Chase et al. .................. 716/112 |

* cited by examiner

Primary Examiner — Suresh Memula
(74) Attorney, Agent, or Firm — LeRoy D. Maunu; Lois D. Cartier

(57) ABSTRACT

A method is provided for generation of a circuit design. A set of design assistance rules is retrieved from a database. Each design assistance rule in the set includes a list of design objects to which the design assistance rule applies, a set of criteria to be satisfied by the circuit design before the design assistance rule may be applied, a set of configuration options, and an executable script configured to perform an automated configuration of the circuit design. In response to a change in the circuit design, applicable design assistance rules are determined based on the corresponding sets of criteria. In response to determining that one or more design assistance rules are applicable, data indicating that the one or more design assistance rules are available is output. In response to input that selects a design assistance rule the executable script corresponding to the selected design assistance rule is executed.

20 Claims, 3 Drawing Sheets

ASSISTANCE TOOL

TECHNICAL FIELD

The disclosure generally relates to the generation of circuit designs.

BACKGROUND

Complex integrated circuits (ICs) can be designed using various levels of abstraction. Using a hardware description language (HDL), circuits can be designed at the gate level, the register transfer level (RTL), and higher logical levels. When designing a circuit using an HDL, the designer describes the behavior of a system in terms of signals that are generated and propagated from one set of registers to another set of registers through various cells of combinatorial logic. HDLs provide a rich set of constructs to describe the functionality of each module. Cells may be combined and augmented to form even higher-level modules.

System-level circuit design may rely on reuse of previously created designs that have been provided either from within an enterprise or from a commercial provider. Such logic blocks include, for example, adders, multipliers, filters, and other arithmetic and digital signal processing (DSP) functions from which circuit designs can be readily constructed. The logic blocks may further include memories and storage elements. The engineering community sometimes refers to these previously created cells as "IP (intellectual property) cells," "cores," or "IP cores," and such terms may be used interchangeably herein.

System-level design tools allow users to create complex circuit designs by instantiating and connecting various design objects (e.g., IP cells) from a library on a design canvas. These design objects can be arranged and connected programmatically (e.g., using TCL code) or interactively in a graphical manner. The use of pre-developed IP cells permits faster design cycles by eliminating the redesign of circuits. Thus, using cells from a library may reduce design costs. Such pre-developed IP cells may be available for purchase by parties who desire the functionality provided by the core.

IP cells include a circuit design in the form of source code or a netlist that may be used in implementing the design in a programmable IC, such as a field programmable gate array (FPGA). IP Cells may be parameterizable. That is, the designer may specify values of parameters to tailor certain core functionality according to the designer's needs.

An IP cell may be integrated into a design by instantiating the code or netlist. The cell is then placed and routed along with the rest of the design to provide the desired functionality. Connection of IP cells to form a larger design, however, may not be a simple task. For example, different logic cores included in a design may be configured to communicate using different communication protocols. Likewise, each communication protocol may include a large number of configuration settings such as clock frequency, data width, etc. Designers not familiar with the topology of a certain system architecture may find it difficult figuring out which IP cells are required, and how to connect and configure the IP cells in the circuit design. Further, even if designers know how to arrange cells for a selected topology, connection and configuration of cells can be a lengthy and burdensome task. Connecting an IP cell that offers an interface is often not as straight forward as defining an association between the source interface and the destination interface. For instance, clocks and resets may need to be correctly connected. Moreover, additional arbitration logic may be required to be included to provide a communication interface between cells using incompatible communication protocols. Manual configurations of the cell parameters and interface logic can be a time-consuming process.

Some system-level design tools may provide design assistance in the form of a design template and/or configurable IP cells. Design templates include a prearranged configuration of some basic IP according to a particular topology. Packaging a subsystem as a design template allows users to begin with a pre-canned design. However, templates are static designs that are not configurable. IP cells, in contrast, provide configurability. However, the level of configurability is limited by the fact that a configurable IP cell cannot manipulate other objects in a circuit design. As a result, the IP cell would be unable to utilize resources already claimed by other parts of the user's design (e.g., debug Module or clocking resources). Further, graphical user interfaces (GUIs) used for configuration of an IP cell become quite complicated as the number of configurable options increases.

Some other system-level design tools may provide limited design assistance in the form of design wizards. Wizards are configurable templates that provide a system view. Wizards may provide a number of auto-configuration functions. However, to reduce complexity of the wizard, assistance is limited to very specific scenarios, such as when the user starts with a blank canvas before any decisions have been made. Once a user changes the configuration of a system, the wizard cannot be used to perform additional auto-configuration tasks. This forces users to make all configuration decisions for a system in commencing the design process. This can be a problem if a designer is initially unaware of all functional requirements of the system. Furthermore, if the end-user is not the original creator of the design that is being worked on (i.e., a partially completed design), design assistance may not be available.

SUMMARY

A method is provided for generation of a circuit design. Using a programmed processor, a set of design assistance rules is retrieved from a database. Each design assistance rule in the set includes a respective list of design objects to which the design assistance rule applies. Each design assistance rule in the set further includes a respective set of criteria to be satisfied by the circuit design before the design assistance rule may be applied. Each design assistance rule in the set further includes a respective executable script configured to perform an automated configuration of the circuit design. Each design assistance rule in the set further includes a respective set of configuration options for the automated configuration of the circuit design. In response to a change in the circuit design, for each design assistance rule in the set of design assistance rules, the programmed processor is used to determine whether or not the corresponding set of criteria is satisfied by the circuit design. In response to determining that the criteria in the respective set are satisfied for one or more design assistance rules of the set of design assistance rules, data indicating that the one or more design assistance rules are available is output. In response to input that selects a design assistance rule of the one or more design assistance rules, executing the executable script corresponding to the selected design assistance rule.

A system for generation of circuit designs is also provided. The system includes a processor and a memory coupled to the processor. The memory is configured with instructions that when executed by the processor implement a modeling process and a graphical user interface (GUI) process. The modeling process is configured to retrieve a set of design assistance rules from a database. In response to a change in the configuration of a circuit design, for each design assistance rule in the set of design assistance rules, the modeling process determines whether or not a corresponding set of design criteria included in the design assistance rule is satisfied by the circuit design, In response to input selecting one of the design assistance rules in a set, the modeling process executes a respective executable script included in the design assistance rule. The GUI process is configured to, in response to the modeling process determining that the respective set of criteria is satisfied for one or more of the design assistance rules, display a graphical message indicating that the one or more design assistance rules is available. The GUI process is further configured to, in response to the modeling process determining that the respective set of criteria is satisfied for one or more of the design assistance rules, provide a mechanism to receive input selecting one of the design assistance rules.

Other approaches will be recognized from consideration of the Detailed Description and Claims, which follow.

BRIEF DESCRIPTION OF THE DRAWINGS

Various aspects of the method and system will become apparent upon review of the following detailed description and upon reference to the drawings, in which.

DETAILED DESCRIPTION

Figure 1:
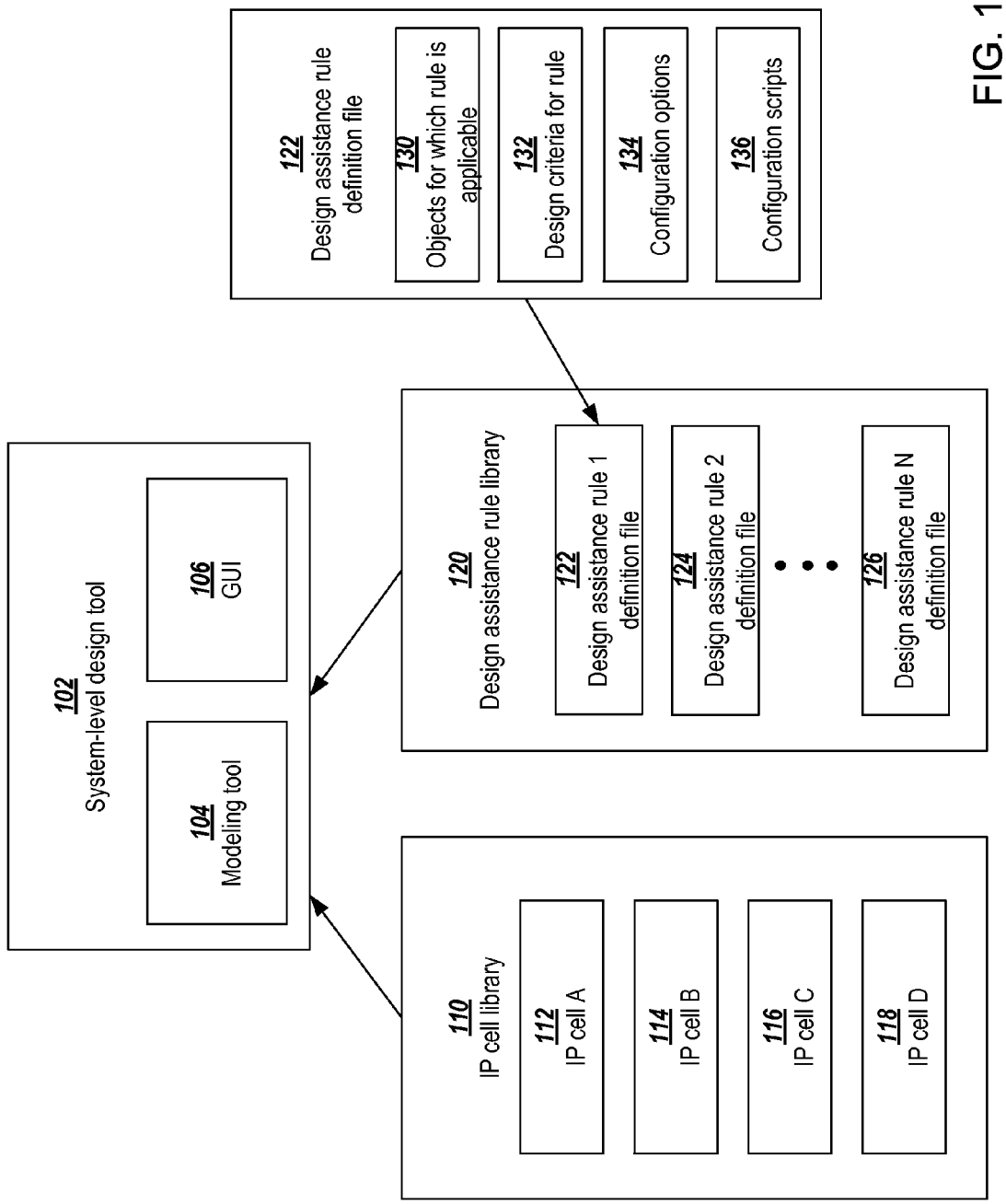
FIG. 1 shows a system-level design tool configured to provide design assistance according to a library of design assistance rules.

Connecting various IP cells to form a system is a complex task. For instance, connection and configuration of parameters of IP cells in a system requires a designer to possess an understanding of the interconnect cells and sub-cells and how these objects fit into the topology of a circuit design. Previous approaches provided design assistance that had limited configurability or were limited to very specific stages in the design process.

A method and system are disclosed for providing adaptive design assistance throughout the design process. The method and system utilize different processes, referred to as design assistance rules, to perform different design assistance tasks. Each design assistance rule is configured to perform a respective design assistance process that can be invoked independent of processes of other design assistance rules. For instance, respective design assistance rules may be invoked at various stages of the design process to help a designer perform a number of automated configuration tasks including the following: selection of system architecture; identification and selection of subsystems to be included in the design; selection of IP cells that may be included to implement various subsystems of the design; connection of selected design objects to other design objects in a design; inference and configuration of parameters for design objects; identification of design objects matching a user criteria; identification and resolution of conflicts; and/or design optimization. The above example tasks are provided for illustrative purposes, and are not intended to limit applications for which design assistance rules may be applied. It is understood that design assistance rules may also be used to add/remove/modify design objects to perform other configuration tasks.

The availability of each design assistance rule is adjusted dynamically based on changes made to the circuit design in the development process. For instance, a design assistance rule configured to connect IP cells in a circuit design may be made unavailable if a user manually configured ports of these cells. However, if a user adds additional IP cells to the circuit design, the design assistance rule (previously made unavailable) may again be made available to automatically connect these new IP cells.

Design assistance rules are stored in a library that is accessible by a system-level design tool. The library may include design assistance rules provided as part of an enterprise distribution or provided by third-party commercial providers. Each design assistance rule includes a rule definition file (e.g., a data structure or TCL script) that defines a respective configuration process of the design assistance rule. The definition file defines a respective list of design objects to which the design assistance rule may be applied. Depending on the design assistance rule, the application of the configuration process may be limited to specific types of design objects indicated in the list (e.g., IP cells, nets, ports, pins, and interfaces) or to specific design objects (e.g., a specific IP cell). The definition file also defines a respective set of criteria that must be satisfied by the circuit design before the design assistance rule may be applied to the circuit design. Depending on the state of the circuit design, availability of a design assistance rule may change during the design process. For instance, a respective set of criteria for a design assistance rule may be determined to not be satisfied based on a first state of a circuit design. However, later, the respective set of criteria for the design assistance rule (previously determined to not be satisfied) may be determined to be satisfied based on a second state of a circuit design.

The definition file also includes a respective executable script configured to perform configuration processes of the design assistance rule. In some implementations, the definition file may also include a respective set of configuration options that may be selected. However, some design assistance rule may not include any configuration options. For these rules, the respective set of configuration options is empty (i.e., a set of 0).

The segregation of configuration processes into independent design assistance rules allows incremental automated changes to be made to a circuit design at any stage of the design process instead of having to perform all automated processes at the beginning of the design process. The availability of each design assistance rule is context sensitive and can be updated based on the current state of the design using the criteria indicated in the respective definition file. This enables the tool to provide relevant choices to users, making the tool more intuitive and easy to use. Moreover, the design assistance rule structure provides a data-driven and extensible framework that may be used by third parties to provide additional design assistance rules. For instance, third party IP cell vendors may provide design assistance rules specifically configured to assist a user with configuration of an IP cell provided by the vendor. Additionally, the extensible framework makes it easier to update and maintain design assistance rules as a system-level design tool is updated to include additional features.

Turning now to the figures, FIG. 1 shows a system-level design tool configured to provide design assistance according to a library of design assistance rules. System-level design tool 102 includes a modeling process 104 configured to maintain a data representation of the objects and connections of a circuit design. The system-level design tool 102 also includes a GUI process 106 configured to allow a user to arrange and connect various design objects to form a circuit design. For instance, in some implementations, a user may use the GUI process 106 to place and connect graphical representations of various design objects (e.g., IP cells 112, 114, 116, and 118) from a database (e.g., IP cell library 110) on a design canvas. Each IP cell in the library 110 includes an IP cell definition file that describes circuits of the cell along with various configurable parameters and supported parameter values.

To assist in the connection and configuration of IP cells and other design objects, the system-level design tool 102 includes a design assistance rule library 120. The design assistance rule library 120 includes a plurality of design assistance rules (e.g., 122, 124, and 126) that may be utilized at various stages of the design process to help a designer perform a number of configuration tasks, as described above. As one example, a design assistance rule may be provided to assist in configuration of parameter values of an IP cell. As another example, a design assistance rule may be provided to detect conflicts between parameters of two directly connected IP cells and resolve the conflict by adjusting parameters of adding interface circuits to the circuit design. In some implementations, based on the current state of the circuit design, a design assistance rule may be used to provide suggestions of steps that are typically performed in the next stage of the design process. For instance, in response to a user adding an IP cell for a processor, a design assistance rule may suggest to add clock circuitry, memory, data bus interfaces, and various peripheral components. The design assistance rule may further assist the designer in adding this circuitry (e.g., provide options for configuration of the circuitry). As indicated above, other design assistance rules may add/remove/modify design objects to perform a number of other configuration processes.

As describe above, each design assistance rule includes a rule definition file (e.g., 122) that defines a respective configuration process of the design assistance rule. The definition file defines a respective list of design objects (e.g., 130) to which the design assistance rule may be applied. The definition file also defines a respective set of criteria (e.g., 132) that must be satisfied by the circuit design before the design assistance rule may be applied to the circuit design. In this example, the definition file 122 include a respective set of configuration options (e.g., 134) that may be selected when the rule is applied. The definition file 122 also includes a respective executable script (e.g., 136) configured to perform configuration processes of the design assistance rule.

Figure 2:
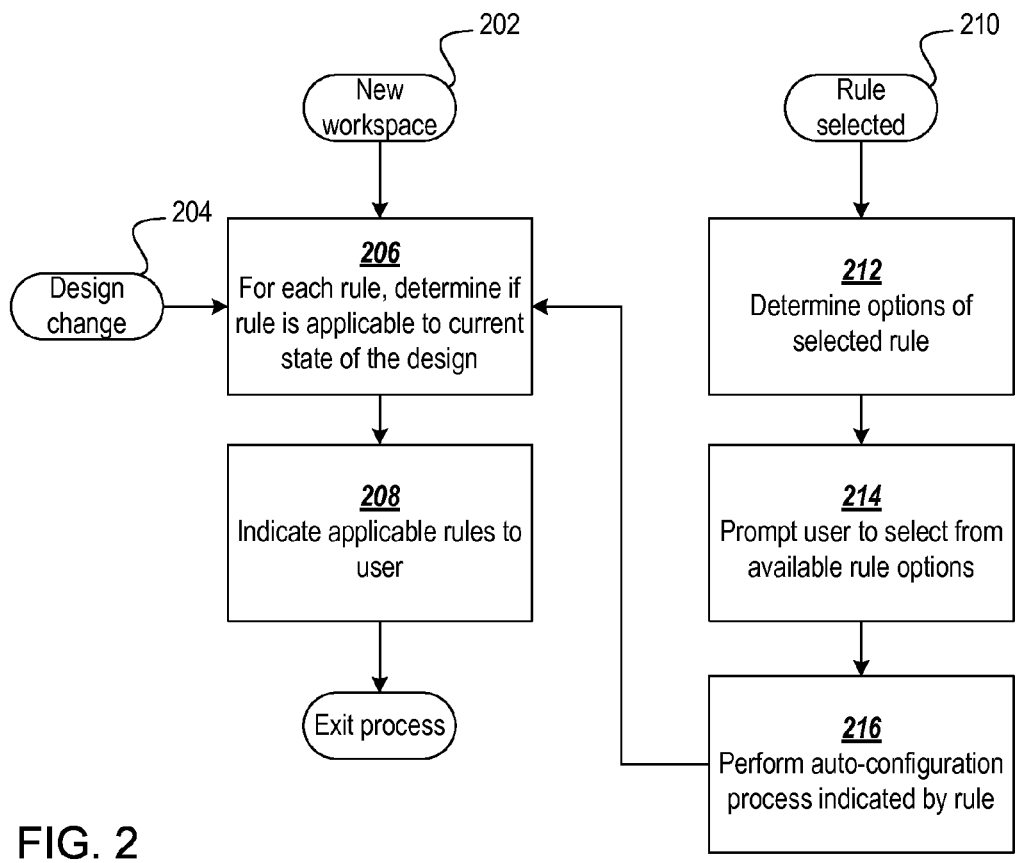
FIG. 2 shows a method for providing design assistance in a system-level design tool.

Use of design assistance rules during operation of a system design tool is described with reference to the example processes shown in FIGS. 2 and 3. FIG. 2 shows a method for providing design assistance in a system-level design tool. As indicated above, different design assistance rules may or may not be applied to a design depending on the state of the design at different stages in the design process. In response to the creation of a new workspace at 202 or to a change to the circuit design at 204, applicable rules are determined at block 206. For each rule, at block 206, it is determined whether or not the rule is applicable to the current state of the design. Availability of a design assistance rule is determined based on a list of design criteria (e.g., 132) included in a respective definition file (e.g., 122) for the design assistance rule. As one example, for a design assistance rule configured to automatically connect ports of a cell in a circuit design, the list of design criteria may indicate that the rule cannot be used to connect ports of a cell if some of the ports have been manually connected by a user. Rules determined to be applicable are indicated to the user at block 208. After indicating the applicable rules to the user, the process exits.

In response to a rule being selected by a user at 210, options available for the selected rule are determined at block 212, and the user is prompted to select from the available options at block 214. Options of a design assistance rule are determined based on a list of options (e.g., 134) indicated in the corresponding definition file 122. In some implementations, availability of options may be determined using a respective set of criteria included in the design assistance rule (e.g., subset of the design criteria 132). Availability of options may vary depending on a number of factors, including, for example, the state of the circuit design and object that the rule is to be used for configuration. For instance, an IP cell for a peripheral device may be configurable to use a selected one of multiple communication protocols (e.g., AXI4 or PCIe). The selection of the communication protocol may be presented as one option. However, if the circuit design includes an interface for only one of the protocols (e.g., AXI4), the option to use the other protocol (e.g., PCIe) may be disabled.

Auto-configuration processes (e.g., configuration scripts 136) are executed at block 216 according to the selected options. After completing the auto-configuration processes, applicable rules are again determined at block 206 based on the new state of the circuit design.

In different implementations, applicable rules may be indicated to a user differently. For example, in some implementations, a GUI (e.g., 106) may display a message (or other indicator) in the corner of the screen if any of the rules are available for any object of the circuit design. In some other implementations, the GUI may display a message/indicator if any of the rules are available for a particular design object that is currently selected by a user. In yet another example, the GUI may highlight design objects of a circuit design for which design assistance rules are available. It is understood that the GUI can be configured to use various other mechanisms (graphical input/output interfaces) to indicate availability and allow a user to provide input. User input may indicate, for example, a selection of design assistance rules, a selection of design objects to be processed, a selection of options, or other criteria to be used by the design assistance rule.

Figure 3:
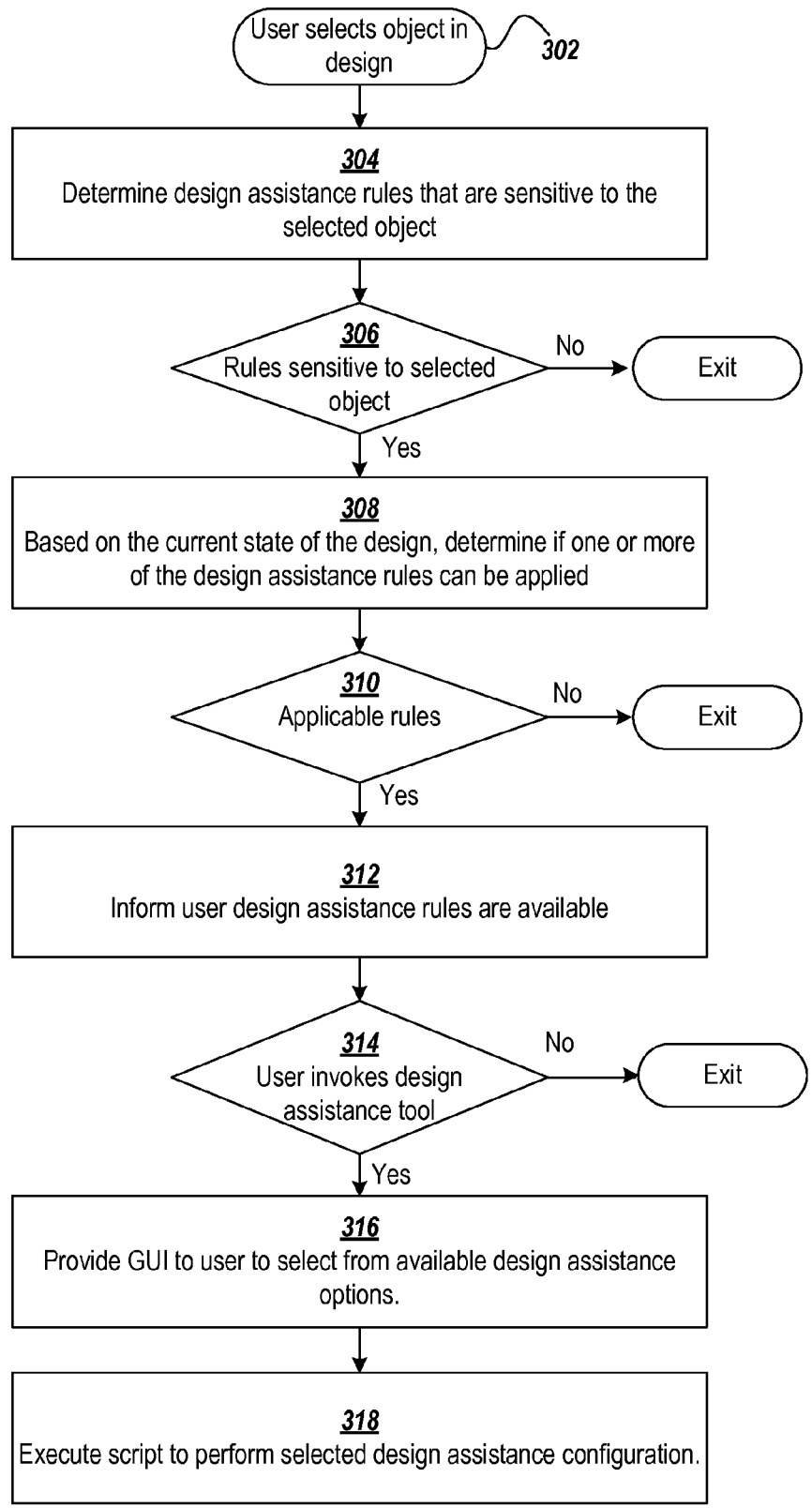
FIG. 3 shows another method for providing design assistance in a system-level design tool.

FIG. 3 shows another method for providing design assistance in a system-level design tool. In this example, available design assistance are determined and presented to a user in response to a user selecting a design object in a circuit design. In response to a user selecting an object in a circuit design at 302, design assistance rules that are sensitive to the selected object (i.e., rules having the object listed in their respective definition file) are determined at block 304. If no rules are sensitive to the selected object at decision block 306, the process exits. Otherwise, at block 308, it is determined if any of the rules sensitive to the selected object are applicable to the current state of the circuit design. If none of the rules is applicable at decision block 310, the process exits. Otherwise, the user is informed of available design assistance rules at block 312.

If the user invokes a design assistance rule at block 314, a GUI is provided at block 316 to allow the user to select from available design assistance options. After options are selected, a script included in the corresponding definition file is executed at block 318 to perform the selected design assistance configuration.

Figure 4:
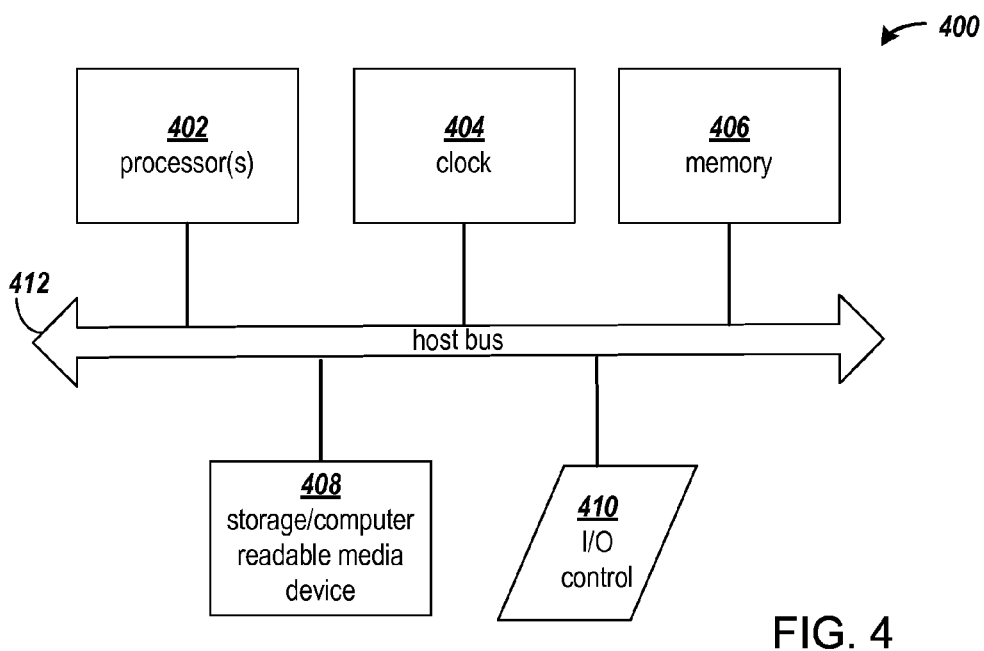
FIG. 4 shows a computing arrangement that may be configured to perform the processes described herein.

FIG. 4 shows a computing arrangement that may be configured to perform the operations and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 400 includes one or more processors 402, a clock signal generator 404, a memory arrangement 406, a storage arrangement 408, and an input/output control unit 410, all coupled to a host bus 412. The arrangement 400 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 402 may be one or more general-purpose processors, or a combination of one or more general purpose processors and suitable co-processors, or one or more specialized processors (e.g., RISC, CISC, pipelined, etc.).

The memory arrangement 406 typically includes multiple levels of cache memory, and a main memory. The storage arrangement 408 may include local and/or remote persistent storage, such as provided by magnetic disks (not shown), flash, EPROM, or other non-volatile data storage. The storage unit may be read or read/write capable. Further, the memory arrangement 406 and storage arrangement 408 may be combined in a single arrangement.

The processor(s) 402 executes the software in storage arrangement 408 and/or memory arrangement 406, reads data from and stores data to the storage arrangement 408 and/or memory arrangement 406, and communicates with external devices through the input/output control arrangement 410. These functions are synchronized by the clock signal generator 404. The resource of the computing arrangement may be managed by either an operating system (not shown), or a hardware control unit (not shown).

Those skilled in the art will appreciate that various alternative computing arrangements, including one or more processors and a memory arrangement configured with program code, would be suitable for hosting the processes and data structures described herein. In addition, the processes may be provided via a variety of computer-readable storage media or delivery channels such as magnetic or optical disks or tapes, electronic storage devices, or as application services over a network.

The methods and systems described herein are thought to be applicable to a variety of circuit design applications. Other aspects and features will be apparent to those skilled in the art from consideration of the specification. For instance, although features may in some cases be described in individual figures, it will be appreciated that features from one figure can be combined with features of another figure even though the combination is not explicitly shown or explicitly described as a combination. The aspects and features may be implemented as one or more processors configured to execute software, as an application specific integrated circuit (ASIC), or as a logic on a programmable logic device. It is intended that the specification and illustrated methods and systems be considered as examples only, with a true scope of the invention being indicated by the following claims.

What is claimed is:

1. A method of generating a circuit design, comprising:
using a programmed processor, performing operations including:
retrieving a set of design assistance rules from a database, each design assistance rule in the set including:
a respective list of design objects to which the design assistance rule applies;
a respective set of criteria to be satisfied by the circuit design for the design assistance rule to be applicable to the circuit design;
a respective executable script configured to perform an automated configuration of the circuit design; and
a respective set of configuration options for the automated configuration of the circuit design;
in response to a change in the circuit design, for each design assistance rule in the set of design assistance rules, determining whether or not the respective set of criteria is satisfied by the circuit design;
in response to determining that the criteria in the respective set are satisfied for one or more design assistance rules of the set of design assistance rules, outputting data indicating that the one or more design assistance rules are available; and
in response to input that selects a design assistance rule of the one or more design assistance rules, executing the executable script corresponding to the selected design assistance rule.

2. The method of claim 1, further comprising:
in response to the input that selects the design assistance rule, providing a graphical user interface for selection of options from the set of configuration options corresponding to the selected design assistance rule; and
wherein the executable script is configured to perform the automated configuration of the circuit design according to the selected options.

3. The method of claim 1, wherein for at least one of the set of design assistance rules, the corresponding set of configuration options lists options for one or more design objects that are available to be added in a next stage in a design process.

4. The method of claim 1, wherein for at least one of the set of design assistance rules, the respective executable script is configured to connect a cell indicated by the input to one or more other cells of the circuit design.

5. The method of claim 1, wherein for at least one design assistance rule in the set of design assistance rules, the respective executable script is configured to, in response to two directly connected cells of the circuit design having conflicting parameter values, infer parameter values for the two directly connected cells that resolve the conflict.

6. The method of claim 1, wherein for at least one design assistance rule in the set of design assistance rules, the respective executable script is configured to, in response to two directly connected cells of the circuit design having conflicting parameter values, add circuitry to the circuit design that is configured to resolve the conflict.

7. The method of claim 1, wherein for at least one design assistance rule in the set of design assistance rules, the respective executable script is configured to set parameters of an IP cell of the circuit design that is indicated by the input.

8. The method of claim 1, wherein for at least one design assistance rule in the set of design assistance rules, the respective executable script is configured to identify cells of the circuit design that match a criterion indicated by the input.

9. The method of claim 1, wherein for at least one design assistance rule in the set of design assistance rules, the respective list of design objects includes IP cells, nets, ports, pins, and interfaces.

10. The method of claim 1, wherein for at least one design assistance rule in the set of design assistance rules, the respective set of criteria includes, for each option in the respective set of configuration options, a respective subset of criteria to be satisfied by the circuit design for the configuration option to be available.

11. The method of claim 1, wherein the operations further include:
receiving an IP cell package including an IP cell and a design assistance rule;
adding the design assistance rule of the IP cell package to the set of design assistance rules;
in response to input, adding an instance of the IP cell to the circuit design; and
using the design assistance rule of the IP cell package to configure one or more parameters of the instance of the IP cell.

12. The method of claim 1, wherein the one or more design assistance rules having respective sets of criteria determined to be satisfied includes at least one design assistance rule having a respective set of criteria that was previously determined to not be satisfied based on a previous state of the circuit design.

13. A system for generation of a circuit design, comprising:
a processor; and
a memory coupled to the processor, the memory configured with instructions that when executed by the processor implement a modeling process and a graphical user interface (GUI) process;
wherein the modeling process is configured to:
retrieve a set of design assistance rules from a database;
in response to a change in the configuration of a circuit design, for each design assistance rule in the set of design assistance rules, determine whether or not a corresponding set of design criteria included in the design assistance rule is satisfied by the circuit design; and
in response to input selecting one of the design assistance rules in a set, executing a respective executable script included in the design assistance rule; and wherein the GUI process is configured to, in response to the modeling process determining that the respective set of criteria is satisfied for one or more of the design assistance rules:
display a graphical message indicating that the one or more design assistance rules is available; and
provide a mechanism to receive input selecting one of the design assistance rules.

14. The system of claim 13, wherein the GUI process is further configured to provide a mechanism to select included in the selected one of the design assistance rules.

15. The system of claim 13, wherein the modeling process is further configured to, in response to input selecting one of the design assistance rules in the set of design assistance rules, determine whether or not each option in a respective set of options is available based on a subset of the set of criteria corresponding to the design assistance rule.

16. The system of claim 13, wherein each design assistance rule in the set of design assistance rules includes a respective list of design objects to which the design assistance rule may be applied.

17. The system of claim 13, wherein for at least one design assistance rule in the set of design assistance rules a respective set of configuration options lists options for a set of design objects that may be added in a next stage in a design process.

18. The system of claim 13, wherein the respective executable script included in the one design assistance rule is configured to connect a cell of the circuit design, indicated by the input, to one or more other cells of the circuit design.

19. The system of claim 13, wherein the respective executable script included in the selected design assistance rule is configured to set parameters of an IP cell of the circuit design that is indicated by the input selecting the design assistance rule.

20. The system of claim 13, wherein the respective executable script included in the selected design assistance rule is configured to identify cells of the circuit design that match a criterion indicated by the input selecting the design assistance rule.

* * * * *